United States Patent [19]

Lawrence et al.

[11] Patent Number: 4,695,676
[45] Date of Patent: Sep. 22, 1987

[54] CABLE BLOCKING AND BLOCK SPLICE PROTECTION

[75] Inventors: Alvah A. Lawrence, Los Altos; Jason W. Neves, Campbell, both of Calif.

[73] Assignee: Raychem Corp., Menlo Park, Calif.

[21] Appl. No.: 740,134

[22] Filed: May 30, 1985

[51] Int. Cl.⁴ .............................................. H02G 15/25
[52] U.S. Cl. .................................... 174/22 R; 156/49; 156/52
[58] Field of Search ...................... 156/48, 49, 52, 55, 156/56; 174/76, 77 R, 92, 102 P, 118, 21 R, 22 R

[56] References Cited

U.S. PATENT DOCUMENTS

| Re. 30,715 | 8/1981 | Woytiuk | 174/107 X |
|---|---|---|---|
| 1,952,097 | 3/1934 | Shanklin | 174/22 R |
| 3,836,694 | 9/1974 | Kapell | 174/76 X |
| 3,896,260 | 7/1975 | Plummer | 174/22 R X |
| 3,919,460 | 11/1975 | Neail et al. | 174/76 X |
| 3,939,882 | 2/1976 | Gillemot | 156/48 X |
| 3,951,712 | 4/1976 | Nakata | 156/48 |
| 4,455,326 | 6/1984 | Garner | 427/117 |
| 4,466,843 | 8/1984 | Shimirak | 156/48 |
| 4,648,919 | 3/1987 | Diaz et al. | 156/49 X |

Primary Examiner—Robert A. Dawson
Attorney, Agent, or Firm—T. Gene Dillahunty

[57] ABSTRACT

This invention relates to an assembly of a splice between a cable containing paper insulation and a cable containing oil or petroleum based materials wherein the splice, or at least the end of the cable containing the oil or petroleum based material, is encapsulated in a particulate material such as calcium carbonate and placed under compression in order to prevent the oil or petroleum based material in one cable from migrating into the splice area or into the other cable and damaging the paper insulation in the splice or the other cable. The assembly also prevents the migration of water from either cable into the splice area.

5 Claims, 1 Drawing Figure

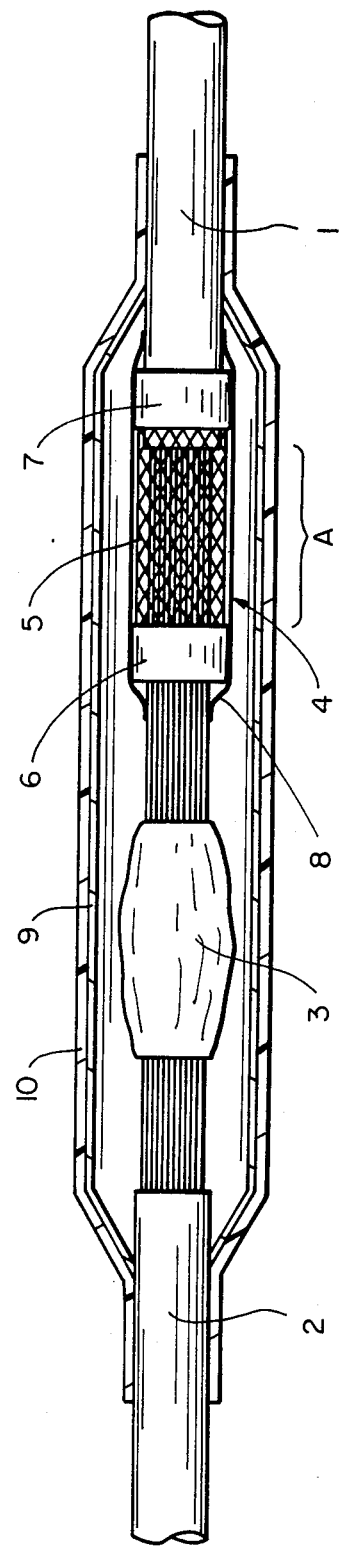
FIG_1

4,695,676

CABLE BLOCKING AND BLOCK SPLICE PROTECTION

FIELD OF THE INVENTION

This invention relates to cable blocking to prevent liquids from moving along the cable or out of the end of a cable and relates to splice protection by preventing liquids such as oil or water from entering the splice area from the interior of a cable.

BACKGROUND OF THE INVENTION

Cable blocking and splice protection have conventionally been performed using liquids such a curable resins which are injected into the cables for cable blocking or are forced into the end of the cable under pressure for splice protection. U.S. Pat. Nos. 3,939,882 to Gillemot and 4,466,843 to Shimirak are exemplary of such methods, the disclosures of which are incorporated herein by reference.

In a particular area of cable splicing, special problems are encountered when splicing a cable containing paper insulation to a cable which contains oil or petroleum based materials, i.e., cables that are generally referred to as "filled" cables and are filled with a grease, petroleum jelly or plasticized urethane type materials. The specific problem encountered in connecting cables of these two different types is due to the oil or petroleum based material migrating from the filled cable into the splice area and contacting or being absorbed in the paper insulation. When this occurs, the mechanical and insulation properties of the paper is reduced or eliminated resulting in failures of the splice. The conventional solution to this problem is to connect the dissimilar cables using a splice stub which contains a complete cable block whereby one end of the stub is spliced to the cable containing the paper insulation and the other end of the stub is spliced to the cable containing the oil or petroleum based materials. The use of the stub prevents the oil or petroleum based materials from migrating into the area containing the paper insulation. The use of such a splice stub is inefficient in that it requires a factory made stub containing the required block and matching the cables to be spliced and requires two splices to be made and protected where it would be desirable to only form and protect one splice.

SUMMARY OF THE INVENTION

It has now been discovered that an effective cable block and cable splice protection can be made using a particulate material such as a dry flowable powder to fill the voids between the conductors then placing the particulate material under compression. It has been known to fill cables with a particulate material, for example see U.S. Pat. No. 4,455,326 to Garner, but it was not recognized that it would be advantageous to use the particulate material for splice protection or for cable blocking, particularly by placing the material under compression to prevent the migration of liquids such as oil or water along the cable or out of the end of the cable.

In one aspect, this invention relates to a method of preventing liquid oil or water from migrating from the interior of a cable comprising:
preparing the cable end for the splice by removing the cable jacket from a portion of the conductors;
positioning a flexible reservoir around a portion of the conductors and a portion of the jacket remaining on the cable;
introducing into the reservoir a sufficient quantity of a particulate material to fill the voids between the conductors and to cover the conductors and the jacket and closing the reservoir; and
applying means to compress the reservoir whereby the particulate material prevents liquid from migrating from the interior of the cable.

In another aspect, this invention relates to a method of protecting a cable splice area from liquid oil or water migrating from the interior of at least one of the cables which comprises:
preparing the cable end for the splice by removing the cable jacket from a portion of the conductors;
positioning a flexible reservoir around a portion of the conductors and a portion of the jacket remaining on the cable;
introducing into the reservoir a sufficient quantity of a particulate material to fill the voids between the conductors and to cover the conductors and the jacket and closing the reservoir; and
applying means to compress the reservoir whereby the particulate material prevents the liquid from migrating from the interior of the cable into the splice area.

In another aspect, this invention relates to a method of protecting the splice area of a splice between a cable containing paper insulation and a cable containing oil or petroleum based materials from the migration of said oil or petroleum based materials into the splice area comprising:
preparing the cable containing oil or petroleum based materials by removing the cable jacket from a portion of the conductors of the cable;
positioning a flexible reservoir around a portion of the conductors and a portion of the jacket remaining on the cable;
introducing into the reservoir a sufficient quantity of a particulate material to fill the voids between the conductors and cover the conductors and the jacket and closing the reservoir; and
applying means to compress the reservoir whereby the particulate material prevents the oil or petroleum based materials from migrating from the interior of the cable into the splice area.

In another aspect, this invention relates to an assembly comprising:
a cable having a portion of the jacket removed to expose the conductors thereof;
a reservoir positioned around a portion of at least one of the cables wherein the reservoir covers a portion of the conductors of said cable and a portion of the jacket remaining on said cable;
a particulate material in the reservoir in sufficient amounts to fill the voids between the conductors and to cover the conductors and the cable jacket; and
means positioned around the reservoir to compress the reservoir whereby the particulate material prevents liquid from migrating from or along the interior of said cable.

This invention further relates to such an assembly comprising a splice between two cables and in particular wherein one of the cables is a cable containing paper insulation and the other cable contains oil or petroleum based materials.

In another aspect, this invention relates to a method of blocking a cable to prevent liquid oil or water from migrating along the interior of the cable which comprises:

removing a portion of the cable jacket to expose the conductors of the cable;

positioning a flexible reservoir around the conductors and a portion of the jacket remaining on the cables;

introducing into the reservoir a sufficient quantity of a particulate material to fill the voids between the conductors and to cover the conductors and the cable jacket and closing the reservoir; and applying means to compress the reservoir whereby the particulate material prevents liquid from migrating along the interior of the cable.

BRIEF DESCRIPTION OF THE DRAWING

FIG. 1 illustrates a cable splice protected with a method and an assembly according to this invention.

DETAILED DESCRIPTION OF THE INVENTION

In the practice of this invention, it is necessary to remove a portion of the cable jacket to expose the conductors of the cable. This can be done at or near the end of the cable, such as adjacent to or near a splice or may be done anywhere along the cable when a simple cable block is desired. When the conductors are exposed, they should be separated to provide some void space between the conductors which can be filled with the particulate material. A flexible reservoir is then placed around a portion of the conductors and a portion of the cable jacket. In the case of a block, it may be desirable to place the reservoir around the cable jacket on both sides of the exposed conductors. In the case of a splice, it may be desirable to place the reservoir around the entire splice as well, whereby the particulate material will fill the voids between the connectors as well as the conductors.

The flexible reservoir is then filled with a particulate material which will flow between the conductors and fill the voids between the conductors. Sufficient particulate material should be placed in the reservoir to completely cover the conductors and cover the portion of the cable jacket which is exposed inside the reservoir. The reservoir is then closed. A reservoir of this type can be installed and closed as generally disclosed in U.S. Pat. No. 3,361,605 to Gilbert, which is incorporated herein by reference.

The flexible reservoir can then be compressed by any suitable means, such as by a pressure wrap as disclosed in U.S. Pat. No. 4,466,843 to Shimirak or by mechanical means such as in patent application Ser. No. 652,359 filed Sept. 18, 1984 and now abandoned.

The flexible reservoir useful in this invention may be any flexible material such as a polymeric material, a metal foil, and the like. It is preferred to use a polymeric sheet or plastic film which is strong enough to support the weight of the particulate material. A preferred flexible reservoir is a plastic film of nylon having a thickness of about 1 to about 2 mils. Various other films or sheets may be used in this invention and the particular material, thickness of the sheet and degree of flexibility will depend on the size of the cable, the means used for compression and other factors desired in the end product formed by the methods of this invention.

It is frequently desirable to use a liner or support means for the flexible reservoir to prevent the reservoir from sagging under the weight of the particulate material. It is particularly desirable to use a support means for the flexible reservoir to maintain the reservoir in a cylindrical shape which adapts readily to be covered by a conventional splice cover, such as a heat shrinkable splice case. The liner or support means used for the flexible reservoir must not interfere with compresion of the reservoir or must itself have sufficient flexibility to be compressed with the reservoir. A preferred liner is a polymeric sheet in a mesh form whereby the mesh form of the sheet can be compressed with the flexible reservoir. A particularly preferred liner or support is a polypropylene sheet having diamond shaped aperatures which overlap one another to allow the support liner to be compressed with the reservoir. Such a supporting liner can be attached to the inside or the outside of the flexible reservoir such as by an adhesive. It is generally preferred that the support liner of this type be bonded to the interior surface of the flexible reservoir.

The particulate materials useful in this invention may be organic or inorganic provided that the material is of sufficiently small particle size to fill the voids between the conductors and is sufficiently free flowing to allow the particulate material to fill the voids between the conductors. The particulate material must be of a nature that when compressed it is effective in preventing a liquid from passing through the material. The particulate material may be polymeric in nature, inorganic in nature or may be mixtures thereof. It is desirable that the particulate material be hydrophobic thereby providing an effective block for water. In the case of oil type materials the hydrophobic particulate material will absorb or adsorb the oil to a limited degree in the particulate material thereby forming an effective block preventing further migration of the oil type materials which may be present in the interior of the cable being blocked or sealed. A preferred particulate material for use in this invention is a mineral and particularly preferred is calcium carbonate having a hydrophobic surface treatment. The particle size and specific material used in this invention will be selected depending on the type of block or seal to be formed by the methods of this invention and will depend on the materials present in the cable to be blocked or sealed. When the particulate material absorbs or adsorbs an oil type liquid, the material may swell providing more effective blocking or sealing. In such case it may be necessary or desirable to use means for compressing the reservoir which will prevent substantial expansion of the reservoir, such as disclosed in patent application Ser. No. 625,355 filed Sept. 18, 1984 and now abandoned.

The means for compressing the flexible reservoir as outlined above should be capable of providing sufficient pressure to hold the particulate material in place in the voids between the conductors and around the conductors and cable jacket. The pressure required will depend on the liquid present in the interior of the cable and the pressure which may be exerted on the liquid present in the interior of the cable.

In general, it will be desirable to place a conventional liner and splice case such as a heat shrinkable splice case over the flexible reservoir to protect the block or splice from environmental conditions.

This invention can be further understood by reference to an exemplary embodiment of this invention shown in FIG. 1 wherein a 100 pair 24 gauge jelly filled cable 1 is spliced to a 100 pair 24 gauge paper insulated cable 2. The conductors are spliced with individual connectors in splice area 3. The jacket of cable 1 is removed in area A to expose the conductors. Flexible reservoir 4 containing a plastic mesh support means 5 is taped around the conductors with tape 6 and taped around the cable jacket with tape 7. Flexible reservoir 4 is a nylon sheet and tapes 6 and 7 are vinyl tapes. Reservoir 4 is filled with a calcium carbonate powder available as "Protexulate" from Protexulate, Inc. Reservoir 4 is closed and wrapped with a pressure wrap of two half-lapped layers of double rubber tape 8. The entire splice area is then covered with conventional liner 9 over which is placed a conventional heat shrinkable splice case 10. In this example, the Protexulate calcium carbonate particulate material inside reservoir 4 fills the voids between the conductors in the cable and is sealed to the cable jacket of cable 1 thereby preventing the oil from migrating from the interior of jelly filled cable 1 and contacting the paper insulated conductors of cable 2 which are present in splice area 3.

What is claimed is:

1. An assembly comprising:
   a cable containing paper insulation spliced to a cable containing oil or petroleum based material;
   a reservoir positioned around at least a portion of the cable containing the oil or petroleum based material wherein the reservoir covers a portion of the conductors of said cable and a portion of the jacket remaining on said cable without covering any part of the splice area;
   a particulate material in the reservoir in sufficient amounts to fill the voids between the conductors and to cover the conductors and the cable jacket; and
   means positioned around the reservoir to compress the reservoir whereby the particulate material prevents liquids and the oil or petroleum based material from migrating from the interior of said cable into the splice area.

2. An assembly according to claim 1 wherein the particulate material is hydrophobic.

3. An assembly according to claim 1 wherein the particulate material comprises an organic material.

4. An assembly according to claim 1 wherein the particulate material comprises an inorganic material.

5. An assembly according to claim 4 wherein the particulate material comprises calcium carbonate.

* * * * *